United States Patent [19]

Arita et al.

[11] Patent Number: 4,652,490

[45] Date of Patent: Mar. 24, 1987

[54] HEAT SHRINKABLE LAMINATED PACKAGING MATERIAL

[75] Inventors: Masanobu Arita, Yatsushiro; Hisao Tanaka, Koganei; Yukio Mogami, Suita, all of Japan

[73] Assignee: Kohjin Co., Ltd., Tokyo, Japan

[21] Appl. No.: 769,833

[22] Filed: Aug. 27, 1985

[30] Foreign Application Priority Data

Mar. 7, 1984 [JP] Japan .................................. 59-43392

[51] Int. Cl.$^4$ .......................... C09J 7/02; B32B 27/08; B29D 7/24
[52] U.S. Cl. .................................. 428/347; 428/476.9; 428/516; 428/910; 428/35; 428/483; 428/424.2; 426/127; 426/129; 264/176.1
[58] Field of Search ...................... 428/476.9, 516, 910, 428/347

[56] References Cited

U.S. PATENT DOCUMENTS 4,197,326  4/1980  Wakamatsu et al. ............... 428/483
4,436,888  3/1984  Copple ................................. 428/910

FOREIGN PATENT DOCUMENTS

WO83/03381  10/1983  World Int. Prop. O. .

*Primary Examiner*—P. C. Ives
*Attorney, Agent, or Firm*—Armstrong, Nikaido, Marmelstein & Kubovcik

[57] ABSTRACT

A heat shrinkable and heat sealable laminated packaging material comprising a heat shrinkable film which is endowed with a heat shrinkability by biaxial stretching in advance of lamination, such as biaxially stretched polyamide film or biaxially stretched polypropylene film, and a heat shrinkable polyolefin sealant film which is endowed with a heat shrinkability by stretching in advance of lamination, such as biaxially stretched linear low density polyethylene film, the sealant film being laminated on one or both surfaces of the heat shrinkable film. The laminated packaging material imparts a tight appearance to a finish package in heat shrink packaging due to its excellent heat shrinkability.

7 Claims, No Drawings

HEAT SHRINKABLE LAMINATED PACKAGING MATERIAL

BACKGROUND OF THE INVENTION

The present invention relates to a heat shrinkable laminated packaging material. More particularly, it relates to an improvement on a heat shrinkable laminated packaging material having a heat sealability.

Heretofore, heat shrinkable plastic films have been used widely for packing a variety of foods.

Heat shrinkable laminated packaging materials are usually used as materials for heat shrink bag packaging. A laminated packaging material consisting of a heat shrinkable base film and a sealant film laminated on one surface of the base film is made into bags by fin seal method or tape seal method. A laminated packaging material consisting of a heat shrinkable base film and a sealant film laminated on both surfaces of the base film is made into bags by methods such as wrap seal. The obtained bag is filled with hams, sausages, cheeses or other goods, and, after evacuated, the bag is heat sealed. Then the bag is subjected to heat shrink treatment in hot air or hot water to provide a tightly covered package.

In same cases, characteristic properties such as stick-up resistance, cold resistance and oxygen barrier are required for packaging materials, depending upon the kind of goods to be packed. In that case, biaxially stretched nylon films are usually used as the heat shrinkable base film. In the case of the nylon films, however, the oxygen barrier is lowered and the film tends to elongate due to moisture absorption. Therefore, the nylon films are usually used in the form of a laminate wherein a heat sealable and not heat shrinkable sealant film or a moisture proof sealant film is laminated on both surfaces of the nylon film.

Conventional heat shrinkable and heat sealable laminated packaging materials are disclosed in U.S. Pat. No. 4,501,779. However, those packaging materials are a multi-layered film wherein a sealant film having substantially no heat shrinkability is laminated on one or both surfaces of a heat shrinkable base film or a multi-layered film which is prepared by laminating a sealant film on a base film and stretching the resulting laminate.

However, those multi-layered films do not have a sufficient heat shrinkability, since the sealant film of the multi-layered film does not have a good heat shrinkability. When the multi-layered films are used in shrink packaging, they are poor in tightness and voids occur within package, which results in poor appearance due to less tightness. Further, the voids are also a cause for the propagation of bacteria since due-drips tend to be caused therein.

When an attempt that the heat shrink treatment is carried out at higher temperatures is made to overcome the above-mentioned drawbacks, any satisfactory finish appearance is not obtained. Furthermore, some goods packed are deteriorated due to such higher temperature shrink treatment.

It is an object of the invention to provide a heat shrinkable and heat sealable laminated packaging material having an excellent heat shrinkability.

This and other object of the present invention will become apparent from the description hereinafter.

SUMMARY OF THE INVENTION

The present invention provides a heat shrinkable and heat sealable laminated packaging material comprising a heat shrinkable film and a heat shrinkable sealant film laminated on at least one surface of the heat shrinkable film.

More specifically, the heat shrinkable and heat sealable laminated packaging material of the present invention is a laminate comprising a base film which is endowed with a heat shrinkability by biaxial stretching in advance of lamination, such as biaxially stretched polyamide film or biaxially stretched propylene polymer film, and a sealant film which is endowed with a heat shrinkability by stretching in advance of lamination, such as biaxially stretched linear low density polyethylene film or biaxially stretched polypropylene film, the sealant film being laminated on one or both surfaces of the base film.

The laminated packaging material of the present invention is superior in heat shrinkability and capable of being heat sealed. When the packaging material is used in heat shrink packaging, it gives a satisfactory finish appearance.

DETAILED DESCRIPTION

As the heat shrinkable film used as a base film in the present invention, there can be used any heat shrinkable film which is biaxially stretched in a stretch ratio of at least 1.5, preferably 1.5 to 7.0, both in the longitudinal and transverse directions and has a hot water shrinkage (at 95° C.) of 15 to 50 %, preferably 20 to 50 %, both in the longitudinal and transverse directions.

Examples of polymers as raw materials for the biaxially stretched film include, for instance, polyamide resins such as 6-nylon, 6,6-nylon, 6,10-nylon, 6-6,6-copolymerized nylon, 6,12-nylon, 11-nylon and 12-nylon; polyester resins such as polyethylene terephthalate and polybutyrene terephthalate; vinyl chloride polymers, acrylonitrile polymers; styrene polymers, olefin polymers such as polypropylene; polyvinyl alcohol; hydrolyzed ethylene-vinyl acetate copolymer (hereinafter referred to as "EVOH"; blends of two or more foregoing polymers; and polymer mixtures containing one or more foregoing polymers as a main component. Those polymers are formed into films and the resulting films are stretched biaxially to obtain biaxially stretched films having a stretch ratio within the above range and a heat shrinkage within the above range. Those films are not limitative of the scope of the base film.

The preferred heat shrinkable base film has a heat shrinkage of more than that of the heat shrinkable sealant film mentioned below. The heat shrinkable base film may have a coating of vinylidene chloride resins, a printing layer, and the like thereon.

The heat shrinkable sealant film used in the present invention is a heat shrinkable sealant film having a melting point lower than that of the heat shrinkable base film. For instance, there are mentioned heat sealable films such linear low density ethylene polymer (hereinafter referred to as "L-LDPE") films, low density ethylene polymer (hereinafter referred to as "LDPE") films, propylene polymer films, ionomer resin films, and films of mixtures of two or more foregoing polymers, which are endowed with a heat shrinkability by biaxial stretching in a stretch ratio of at least 1.5, preferably 1.5 to 7.0, both in the longitudinal and transverse directions and have a hot water shrinkage (at 95° C.) of 10 to 50 %, preferably 15 to 50 %, both in the longitudinal and transverse directions. Among those sealant films, heat shrinkable L-LDPE films are preferred, since they are excellent in stick up resistance and heat seal strength. For practical use, it is suitable to select a sealant film having the same degree of heat shrinkage as that of the heat shrinkable base film used.

Usually the thickness of the heat shrinkable base film ranges from 5 to 50μ. A base film having a thickness of 10 to 35μ is preferred. Usually the thickness of the heat shrinkable sealant film having a thickness of 10 to 50μ. A sealant film having a thickness of 10 to 40μ is preferred.

The combinations of the base film and the sealant film are selected appropriately in consideration of required characteristics such as oxygen barrier, stick up resistance and heat seal strength, depending upon the particular use of the packaging material. The preferred laminated packaging material is one wherein the heat shrinkable film is a biaxially stretched film comprising a polyamide and the heat shrinkable sealant film is a biaxially stretched film comprising a linear low density ethylene polymer which is laminated on both surfaces of the heat shrinkable film.

The heat shrinkable laminated film of the present invention is obtained by laminating the above-mentioned heat shrinkable base film and heat shrinkable sealant film together by a conventional lamination method, for example, extrusion lamination or dry lamination. The extrustion lamination comprises melt-extruding a film-forming thermoplastic resin through the narrow slit of an extruder T die onto a base film, while simultaneously overlaying a sealant film onto the extruded thermoplastic resin layer, followed by cooling for solidification. The dry lamination comprises applying an organic solvent type adhesive such as polyurethane adhesive, to a base film, removing the solvent by drying, and laminating a sealant film to the so-treated base film with heating under pressure.

The processing conditions in the above lamination are selected adequately, depending upon the combination of the base film and sealant film to be laminated to each other.

The thus obtained heat shrinkable laminated film according to the invention is capable of heat-sealing on the sealant layer side and has a sufficient heat shrinkability without any damage to the heat shrinkability of the heat shrinkable base film which results from the lamination of the sealant film to the base film.

Furthermore, since the laminated packaging material according to the invention has not only good heat shrinkability but also good heat-sealability, it can be used in a variety of manners. For example, a laminated film having a sealant film on one side thereof can be used as a shrinkable heat-seal tape, when slit into tapes. Furthermore, this laminated film and the laminated film having a sealant film on both sides thereof are used as a packaging material for bag package. That is, the laminated film of the former is made into bags by fin seal method, tape seal method, etc., and the laminated film of the latter is made into bags by wrap seal method, etc. The obtained bag is filled with a good and heat-sealed after evacuation. Then the bag containing the good is subjected to heat shrink by methods such as immersion into hot water to provide a tightly covered package.

Especially, a laminated film wherein the base film is a heat shrinkable nylon film and a heat shrinkable sealant film of L-LDPE is laminated on both surfaces of the base film is a noticeably excellent heat shrinkable packaging material, since it is excellent in characteristic properties such as oxygen barrier, stick up resistance and cold resistance and is hardly affected by the air or humidity. Furthermore, since the L-LDPE sealant film provides a high heat seal strength, a thin sealant film can be used and it is possible to made the width of lap portion narrow in wrap seal, which provides a good appearance to the seal portion.

Accordingly, the laminated packaging material of the present invention is suitable for packing meats and other goods.

The packaging material of the present invention, which is a laminate produced by laminating a packaging base film endowed with a heat shrinkability by stretching and a sealant film endowed with a heat shrinkability by stretching to each other, has the following advantages over, for example, a packaging material which is produced by preparing a laminate composed of a base layer and a sealant layer by co-extrusion and stretching the resulting laminate. According to the present invention, a base film having a printing layer thereon and a sealant film can be laminated to each other so that the printing layer is positioned within the inside of the laminate, which provides a fine and clear view of the printing and prevents the printing from removed due to abrasion and action of oil, water or the like. Those advantages cannot be attained with the above-mentioned packaging material produced by stretching the coextruded or laminated film. In the case of the packaging material, it is only possible to provide a printing on the surface of the final product after stretching.

Furthermore, a single layer film as used in the present invention is suited in mass-production, as compared with a multi-layered film, since in the production of the single layer film, simple production equipment is sufficient and the quality of the product can be controlled readily. According to the present invention, a laminated film having desired characteristics such as shrinkability, oxygen barrier, heat sealability and stick-up resistance can be readily obtained by combining appropriately stretched single layer films which are readily produced as mentioned above, as a base film and a sealant film. This is also an advantage over the above-mentioned packaging material which is endowed with a heat shrinkability by stretching the previously obtained multi-layered film.

The present invention is more specifically described and explained by means of the following Examples. It is to be understood that the present invention is not limited to the Examples, and various change and modifications may be made in the invention without departing from the spirit and scope thereof.

The principal characteristics to be measured in accordance with the invention are measured by the following methods:

1. Hot water shrinkage

A specimen film having a size of about 20 cm x about 20 cm is cut from the packaging material to be tested and conditioned under the conditions of 20° C. and 65 % RH for 24 hours. Then the lengths of the film in both the longitudinal (machine) and transverse directions are measured accurately (each measured value being designated as A). The specimen is immersed wholly in hot water under the conditions mentioned below, then taken out, deprived of adhering moisture on the surface with a filter paper, and allowed to stand at 20° C. and 65 RH for 24 hours. The lengths of the film in both the longitudinal and transverse directions are measured accurately (each measured value being designated as B). The hot water shrinkage is calculated as follows:

Hot water shrinkage (%)=[(A-B)/A]×100

Immersing condition:
(i) A laminate having a sealant film on one surface of a base film
The specimen is immersed in boiling water (98° to 100° C.) for 10 seconds.
(ii) A laminate having a sealant film on both surfaces of a base film
The specimen is immersed in boiling water (98° to 100° C.) for 5 minutes.
(iii) A laminate having a LDPE sealant film on one surface of a base film
The specimen is immersed in hot water (95° C.) for 10 seconds.

(2) Heat seal strength

The packaging material to be tested is conditioned at 20° C. and 65 % RH for 24 hours. Two specimens having a size of 25 mm×300 mm are cut from the packaging material. One specimen is put upon another specimen with the sealant film surface of the former facing that of the latter. The specimen system is subjected to heat sealing using a bar sealer set to a predetermined temperature (pneumatic cylinder diameter: 50 mm φ, seal bar size: 10 mm width×300 mm length) under the conditions: pressure 1 kg/cm² (pneumatic cylinder pressure gauge) and sealing time 1 second. Then, the specimen system is conditioned at 20° C. and 65 % RH for 24 hours, followed by cutting a tape having a width of 15 mm from the specimen system in the direction perpendicular to the seal direction. The tape is held with the chucks of a Tensilon tester and elongated at a rate of 300 mm/minute. The tenacity valve is read on the Tensilon chart.

The tape from the specimen system sealed by fin seal method is elongated so that the direction of elongation makes an angle of 90° with the film direction of the sealed portion. The tape from the specimen system sealed by wrap seal method is elongated so that the different specimen films on both sides or the sealed portion are chucked, respectively, and pulled in opposite directions.

(3) Stick-up resistance

The stick-up resistance is represented in terms of pin impact strength as measured below The packaging material to be tested is fixed to a circular frame having an inner diameter of 60 mm. A pin, the tip of which is of semi-sphere having a radius of curvature of 0.5 mm, is touched to the center of the film with the pin being perpendicular to the film surface. Then the pin is moved down at a rate of 50±5 mm/minute and the maximum resistance strength is measured until the film is broken. The measured resistance strength value (kg) is designated as the pin impact strength.

(4) Oxygen barrier

The oxygen barrier is represented in terms of an oxygen gas permeability which is measured by an oxygen gas permeability tester (Mocon OX-TRAN Model 100 made by Modern Controls Inc. in U.S.A.) according to ASTM D-1434.
Measuring conditions
Dry: The oxygen gas permeability is measured in a dry condition with respect to the specimen which is allowed to stand in a desiccator for absolute drying for 24 hours.
Wet: The oxygen gas permeability is measured in a wet condition with respect to the specimen which is immersed in water for 24 hours.

EXAMPLE 1

A simultaneously, biaxially stretched, heat shrinkable nylon-6 film having a thickness of 15μ (available under the commercial name "BONYL-S", made by Kohjin Co., Ltd.) (hereinafter referred to as "Film A") and a simultaneously, biaxially stretched, heat shrinkable L-LDPE film having a specific gravity of 0.92 and a thickness of 30μ and which was corona-treated on one surface thereof and had a wetting tension of 40 dyne/cm with respect to the corona-treated surface (available under the commercial name "KOHJIN BO-LS", made by Kohjin Co., Ltd) (hereinafter referred to as "Film D") were dry-laminated to each other at about 70° C. using an adhesive for dry lamination which was composed of 90 parts by weight of a polyester resin (available under the commercial name "AD-503", made of Toyo-Morton Co., Ltd.) and 10 parts by weight of an isocyanate component (available under the commercial name "CAT-10", made by Toyo-Mortan Co., Ltd.) so that the corona-treated surface of the L-LDPE film faced the nylon film. After aged at 35° to 40° C. for 2 days, the obtained laminate was evaluated for physical characteristics. The results are shown in Table 1.

Comparative Example 1

The same heat shrinkable nylon-6 film (Film A) as employed in Example 1 and a non-stretched L-LDPE film having a specific gravity of 0.92 and a thickness of 30μ and which was corona-treated on one surface thereof and had a wetting tension of 40 dyne/cm with respect to the corona-treated surface (hereinafter referred to as "Film G") were dry-laminated to each other about 70° C. using the same adhesive as employed in Example 1. After aged in the same condition as in Example 1, the obtained laminate was evaluated for physical characteristics. The results are shown in Table 1.

As the results indicate, the laminated film of Example 1 according to the invention was comparable in hot water shrinkage to the heat-shrinkable nylon-6 single film, considerably higher in heat sal strength than the L-LDPE single film and, upon shrinking, assumed an appearance almost free of curling or wrinkles.

On the contrary, the laminated film of Comparative Example 1 was considerably lower in hot water shrinkage than the heat-shrinkable nylon-6 single film, was also low in heat shrinkage than the L-LDPE single film, underwent significant curling during the period of aging or hot water shrinking and, thereafter, was in an unsatisfactory condition from the finish appearance viewpoint, with small wrinkles remarkable noted in the sealed area.

EXAMPLE 2

A solution of vinylidene chloride resin (hereinafter referred to as PVDC) (available under the commercial name "Saran F-216", made by The Dow Chemical Company) in a mixed solvent composed of tetrahydrofuran and methyl ethyl ketone (50/50 by weight) was applied to one surface of the same heat shrinkable nylon-6 film (Film A) as employed in Example 1 in a coating thickness of 2μ on the dried basis (the coated film obtained is hereinafter referred to as "Film B"). To the vinylidene chloride resin-coated side of this film, there was laminated the same heat shrinkable L-LDPE film (Film D) as employed in Example 1 by extrusion lamination using a low density polyethylene (LDPE) so as to give the film construction given below The laminated film obtained was evaluated for physical characteristics The results are shown in Table 1
Film construction:
15μ thick BO heat shrinkable nylon-6 film/2μ thick PVDC layer/20μ thick LDPE layer/30μ thick BO-L-LDPE film
In the above, "BO" indicates that the film is a biaxially stretched one (hereinafter the same).

Comparative Example 2

To the PVDC-coated surface of the PVDC-coated heat shrinkable nylon-6 film (Film B) obtained in Example 2, there was laminated the same non-stretched L-LDPE film (Film G) as employed in Comparative Example 1 by extrusion lamination using LDPE so as to give the film construction shown below. The laminated film thus obtained was evaluated for physical characteristics. The results are shown in Table 1.
Film construction:
15μ thick BO heat shrinkable nylon-6 film/2μ thick PVDC layer/20μ thick LDPE layer/30μ thick L-LDPE film
The laminated film of Comparative Example 2 revealed a reduction by about 30 % in hot water shrinkage as compared with the nylon base film. On the other hand, the laminated film of Example 2 according to the invention showed no decrease in hot water shrinkage as compared with the nylon base flm, underwent curling only to a slight extent during aging or hot water shrinking and, thereafter, assumed a good appearance, with only a small number of wrinkles observed in the heat-sealed area.

EXAMPLE 3

A simultaneously, biaxially stretched, heat shrinkable L-LDPE film having a specific gravity of 0.92 and a thickness of 15μ and which was corona-treated on one surface thereof and had a wetting tension of 40 dyne/cm with respect to the corona-treated surface (hereinafter referred to as "Film E") was dry-laminated to both surfaces of the same heat shrinkable nylon-6 film (Film A) as employed in Example 1 at 70of, respectively, with using the same adhesive as employed in Example 1 so that the corona-treated surface of the L-LDPE film faced the nylon-6 film. After aged in the same condition as in Example 1, the laminated film obtained was evaluated for physical characteristics. The results are shown in Table 1.
The laminated film was made into a tubing by wrap seal with a lap width of 2 mm and the one end of the tubing was round-sealed with a seal width of 2 mm to give a bag having a length of 300 mm and having a round bottom with 165 mm in layflat width. The bag was filled with a roast ham with an undetermined shape and having a length of 25 cm. After the bag was evacuated, the open end thereof was flat-sealed with a seal width of 2 mm. Then the bag containing the ham was subjected to heat shrink treatment by hot water showering at 95° C. for 5 minutes and further by hot bath treatment at 90° C. for 10 minutes.

In the obtained package, the laminated film covered so much tightly the content with an undetermined shape and any void was not formed between the bag and the content, which resulted in causing no due-drips. Further, the package had an extremely beautiful appearance. The tightness was maintained after 10 days from the packing and no due-drips were observed.

EXAMPLE 4

The same procedures as in Example 3 except that a simultaneously, biaxially stretched, heat shrinkable polypropylene film having a thickness of 15μ and which was corona-treated on one surface thereof and had a wetting tension of 40 dyne/cm with respect to the corona-treated surface (available under the commercial name "KOHJIN KORAP" made by Kohjin Co., Ltd.) (hereinafter referred to as "Film F") was used as a sealant film instead of the heat shrinkaole L-LDPE film were repeated to give a laminated packagb.ng material. The physical characteristics of the packaging material were evaluated. The results are shown in Table 1.

COMPARATIVE EXAMPLE 3

The same procedures as in Example 3 except that a 15μ thick non-stretched L-LDPE film corona-treated on one surface thereof and having a wetting tension of 40 dyne/cm with respect to the corona-treated surface (available under the commercial name "KOHJIN L ACE" made by Kohjin Co., Ltd.) (hereinafter referrd to as "Film H") was used as a sealant film instead of the heat shrinkable L-LDPE film were repeated to give a laminated packaging material. The physical characteristics of the packaging material were evaluated. The results are shown in Table 1.
As the results indicate, the laminated packaging material of Example 4 was slightly inferior to that of Example 3 in heat shrinkability and stick-up resistance but superior in heat shrinkability to that of Comparative Example 3 using non-shrinkable sealant film.

EXAMPLE 5

A copolymerized polyamide composed of 6-nylon/6,6-nylon =85/15 (by weight) (available under the commercial name "Novamid" made by MITSUBISHI CHEMICAL INDUSTRIES LTD.) was extruded at 250° to 260° C. to give a non-stretched tubular film having a diameter of 66 mm and a thickness of 145μ.
The non-stretched tubular film was subjected to simultaneous and biaxial stretching treatment at 75° to 80° C. by tubular stretching method. The ° tretched tubular film is cut open and heat-set at 150° C. for 10 seconds by means of a tenter to give a heat shrinkable film having a thickness of 15.5μ (hereinafter referred to as "Film K"). The heat shrinkage of the film is shown in Table 2.

To both surfaces of the heat snrinkable film obtained above, there was laminated the same heat shrinkable L-LDPE film (Film E) as employed in Example 3 as in the same manner as in Example 3. The physical characteristics of the laminated film obtained were evaluated. The results are shown in Table 1.

COMPARATIVE EXAMPLE 4

The same procedures as in Example 5 except that the non-stretched L-LDPE film (Film H) was used as a sealant film instead of the heat shrinkable L-LDPE film (Film E) were repeated to give a laminated packaging material. The physical characteristics of the packaging material were evaluated. The results are shown in Table 1.

COMPARATIVE EXAMPLE 5

A commercially available heat shrinkable polyvinylidene chloride packaging film having a heat sealability on both surfaces thereof was obtained and the physical characteristics thereof were evaluated. The results are shown in Table 1.

As the results obtained in Examples 3, 4 and 5 and Comparative Examples 3, 4 and 5 indicate, the heat shrinkable laminated packaging materials having a heat sealability on both surfaces thereof according to the invention were superior in heat shrinkability, heat sealability and stick-up resistance to the conventional heat shrinkable laminated packaging material having a heat sealability on both surfaces thereof, and also were noticeably superior in heat sealability, stick-up resistance and oxygen gas barrier to the conventional heat shrinkable polyvinylidene chloride packaging film having a heat sealability on both surface thereof, though the heat shrinkability of the former was somewhat inferior to that of the latter.

EXAMPLE 6

A biaxially stretched heat shrinkable polypropylene film having a thickness of 20μ (available under the commercial name "KOHJIN KORAP", made by Kohjin Co., Ltd.) was corona-treated on both surfaces thereof to give a film having a wetting tension of 39 dyne/cm on both surfaces (hereinafter referred to as "Film C").

A polka-dotted pattern was printed on one surface of the above heat shrinkable film using a blue printing ink for polypropylene film. The printing was carried out with any difficulty.

To both surfaces of the film, there was laminated the heat shrinkable L-LDPE film (Film E) using the same dry lamination adhesive as used in Example 1, so that the corona-treated surface of the L-LDPE film faced the polypropylene film. The laminated film obtained was allowed to stand for 2 days at 40° C. Then the physical characteristics of the laminated film were evaluated. The results are shown in Table 1.

Bags were produced from the above laminated film usin9 an automatic bag producing machine. That is, the laminated film was made into a tubing by wrap seal with a lap width of 2 mm and one end of t[e tubing was round-sealed with a seal width of 2 mm to give a bag having a length of 300 mm and a round bottom with 165 mm in layflat width. In producing bags, no troubles were caused.

As described above, the laminated packaging material of Example 6 had not only excellent heat shrinkability and stick-up resistance but also excellent printability and processability in bag production. The reason therefor is attributable to the synergistic effect of the excellent heat shrinkability and processability of the polypropylene film layer as a core layer and the excellent heat shrinkability and stick-up resistance of the sealant film layer.

EXAMPLE 7

The same procedures as in Example 1 except that a heat shrinkable polyester film having a thickness of 12μ (made by Dia Foil Kabushiki Kaisha) (hereinafter referred to as "Film I") was used as a heat shrinkable film and a biaxially stretched LDPE film having a thickness of 30μ (hereinafter referred to as "Film J") was used as a sealant film were repeated to give a laminated packaging material. The physical characteristics of the laminated packaging material are shown in Table 1.

The packaging material was slit into tapes having a width of 6 mm. When the tape was used as a seal tape in producing bags from the same packaging material, the production of bags was carried out much smoothly due to excellent toughness of the polyester film.

The obtained bag was suited for use in exterior packaging for hams, sausages, etc.

The packaging material of Example 7 was excellent, particularly, in heat shrinkability and also excellent in heat seal strength and stick-up resistance.

COMPARATIVE EXAMPLE 6

A low density polyethylene having a melting point of 111.5° C. and a specific gravity of 0.920 at 25° C. (available under the commercial name "UBE HF 019" made by Ube Industries Ltd.) was melted at 200° to 250° C. in an extruder. Separately, polyethylene terephthalate having an intrinsic viscosity of 0.7 was melted at 287° C. in another extruder.

The two melted resins were extruded downward through a double circular die having a slit diameter of 75 mm so that the polyethylene terephthalate layer became an inner layer and the ratio of the inner layer thickness to the outer layer thickness was 1 : 2. The extruded molten tubular two-layered film was cooled indirectly by slidingly contacting the inside surface of the film with the outside surface of a cylindrical mandrel having an outer diameter of 66 mm in which a cooling water of 30° C. was circulated and which was positioned just below the die, while blowing a cold air onto the outside surface of the film at a high speed in the mandrel area to cool the film externally, yielding a non-stretched laminated tubular film having a diameter of 66 mm and a thickness of 234μ and in which the degree of crystallization of the polyethylene terephthalate layer was 18 %.

The non-stretched tubular film was subjected to a simultaneous and biaxial stretching treatment by tubular method in the following manner: The tubular film was pre-heated up to 70° C. with a hot air Then, the tubular film was stretched in a stretching zone wherein the temperature at the starting point of stretching was 107° C., the temperature of the initial area of ⅓ the whole length of the stretching zone was in the range of 105° to 108° C., and the temparature of the residual area of the stretching zone descended continuously from 104° to 75° C. The stretched tubular film was cooled to a room temperature to give a biaxially stretched tubular laminated film having a diameter of 200 mm and a thickness of 41μ. Then, the stretched film was heat-set at 80° C. for 10 seconds. The physical characteristics of the laminated film obtained were evaluated. The results are shown in Table 1.

As the results indicate, the laminated film of Comparative Example 6 had a heat shrinkability considerably lower than that of the laminated film of Example 6 wherein the stretched heat shrinkable film and the stretched sealant film were laminateo to each other. Furthermore, there was observed a phenome-on that the laminated film was markedly curled in the direction of the polyethylene terephthalate layer side The reason therefor is attributable to the fact that since the polyethylene sealant layer was stretched simultaneously with the polyethylene terephthalate layer. the polyethylene sealant layer after stretched did not have almost a residual shrinkage, by which the shrinkability of the polyethylene terephthalate layer was reduced.

TABLE 1

|  |  | Ex. 1 | Com. Ex. 1 | Ex. 2 | Com. Ex. 2 | Ex. 3 | Ex. 4 | Com. Ex. 3 |
|---|---|---|---|---|---|---|---|---|
| Film construction[1] | | A//D | A//G | B//D | B//G | E//A//E | F//A//F | H//A//H |
| Laminating method[2] | | Dry | Dry | Extrusion | Extrusion | Dry | Dry | Dry |
| Thickness ($\mu$) | | 50 | 50 | 67 | 67 | 45 | 45 | 45 |
| Hot water shrinkage (%)[3] | | B | B | B | B | A | A | A |
| MD | | 20.8 | 14.2 | 20.5 | 14.2 | 18.6 | 17.2 | 14.8 |
| TD | | 21.2 | 14.5 | 21.2 | 14.7 | 20.7 | 18.1 | 13.0 |
| Heat seal strength (kg/15 mm) | | | | | | | | |
| Fin seal at 160° C. | MD | 4.9 | 3.8 | 4.2 | 3.8 | — | — | — |
| | TD | 5.2 | 3.4 | 4.8 | 3.2 | — | — | — |
| at 180° C. | MD | 5.6 | 4.0 | 5.1 | 4.2 | — | — | — |
| | TD | 6.2 | 4.9 | 4.9 | 4.3 | — | — | — |
| Wrap seal at 180° C. | MD | — | — | — | — | 8.7 | 6.8 | 8.5 |
| | TD | — | — | — | — | 9.0 | 7.2 | 8.9 |
| Stick-up resistance (kg) | | 1.9 | 1.2 | 1.9 | 1.3 | 1.8 | 1.7 | 1.8 |
| Oxygen gas barrier (cc/m$^2$/atm/24 hr) | | | | | | | | |
| Dry | | 27 | 27 | 12 | 12 | 26 | 27 | 27 |
| Wet | | 120 | 118 | 13 | 13 | 27 | 27 | 27 |

|  |  | Ex. 5 | Com. Ex. 4 | Com. Ex. 5 | Ex. 6 | Ex. 7 | Com. Ex. 6 |
|---|---|---|---|---|---|---|---|
| Film construction[1] | | E//K//E | H//K//H | PVDC film | E//C//E | I//J | PET/LDPE |
| Laminating method[2] | | Dry | Dry | — | Dry | Dry | Co-extrusion |
| Thickness ($\mu$) | | 45.5 | 45.5 | 42 | 50 | 42 | 41 |
| Hot water shrinkage (%)[3] | | A | A | B | B | C | C |
| MD | | 27.2 | 20.5 | 27.5 | 20.5 | 32.1 | 20.4 |
| TD | | 26.9 | 20.2 | 19.3 | 20.9 | 36.5 | 18.9 |
| Heat seal strength (kg/15 mm) | | | | | | | |
| Fin seal at 160° C. | MD | — | — | — | — | 1.4 | 1.2 |
| | TD | — | — | — | — | 1.3 | 1.2 |
| at 180° C. | MD | — | — | — | — | — | — |
| | TD | — | — | — | — | — | — |
| Wrap seal at 180° C. | MD | 8.8 | 8.7 | 3.2 | 8.8 | — | — |
| | TD | 8.9 | 9.0 | 2.9 | 8.9 | — | — |
| Stick-up resistance (kg) | | 1.8 | 1.7 | 1.1 | 1.7 | 1.4 | 1.5 |
| Oxygen gas barrier (cc/m$^2$/atm/24 hr) | | | | | | | |
| Dry | | 29 | 30 | 43 | >1,000 | 98 | 85 |
| Wet | | 31 | 32 | 45 | >1,000 | 102 | 88 |

[1]The alphabetical characters indicate the films shown in Table 2. The symbol "A//D" means that the film A and the film B are laminated to each other. This is applied to the other symbols.
[2]The term "Dry" means the dry lamination. The term "Extrusion" means the lamination using an extruded LDPE layer having a thickness of 20$\mu$. The term "Co-extrusion" means that a laminated film is produced by co-extrusion of the starting resins and then the resulting film is stretched.
[3]"A", "B" and "C" mean the following conditions in measuring the hot water shrinkage.
A: 100° C. × 5 minutes
B: 100° C. × 10 seconds
C: 95° C. × 10 seconds

TABLE 2

| Film name | A | B | C | D | E |
|---|---|---|---|---|---|
| Kind | Heat shrinkable film | Heat shrinkable film | Heat shrinkable film | Heat shrinkable sealant film | Heat shrinkable sealant film |
| Content | Biaxially stretched polyamide film | PVDC-coated biaxially stretched polyamide film | Biaxially stretched polypropyrene film | Biaxially stretched L-LDPE film | Biaxially stretched L-LDPE film |
| Thickness ($\mu$) | 15 | 17 | 20 | 30 | 15 |
| Hot water shrinkage (%)* | B | B | B | B | B |
| MD | 20.9 | 20.5 | 19.2 | 23.1 | 23.5 |
| TD | 21.1 | 20.8 | 20.1 | 22.9 | 23.2 |

| Film name | F | G | H | I | J | K |
|---|---|---|---|---|---|---|
| Kind | Heat shrinkable sealant film | Non-shrinkable sealant film | Non-shrinkable sealant film | Heat shrinkable film | Heat shrinkable sealant film | Heat shrinkable film |
| Content | Biaxially stretched polypropyrene film | Non-stretched L-LDPE film | Non-stretched L-LDPE film | Biaxially stretched PET film | Biaxially stretched LDPE film | Biaxially stretched 6/6,6-nylon film |
| Thickness ($\mu$) | 15 | 30 | 15 | 12 | 30 | 15.5 |
| Hot water shrinkage (%)* | B | B | B | B | C | B |
| MD | 17.5 | 0 | 0 | 35.5 | 31.2 | 29.4 |
| TD | 18.1 | 0 | 0 | 43.4 | 33.6 | 28.9 |

*The same as "[3]" in Table 1

In addition to the ingredients or elements used in the Examples, other ingredients or elements can be used in the Examples as set forth in the specification to obtain substantially the same results.

What is claimed is:

1. A heat shrinkable and heat sealable laminated packaging material comprising a heat shrinkable base film and a heat shrinkable sealant film laminated of at least one surface-of the heat shrinkable base film, the laminated packaging material having a biaxially stretched base film having a heat shrinkage of 15 to 50% in each of the longitudinal and transverse directions and, laminated on at least one surface of the biaxially stretched base film a biaxially stretched sealant film having a melting point lower than said base film and a heat shrinkage of 10 to 50% in each of the longitudinal and traverse directions.

2. The packaging material of claim 1, wherein the heat shrinkable sealant film is a biaxially stretched olefin polymer film.

3. The packaging material of claim 1, wherein the heat shrinkable base film is at least one of a biaxially stretched polyamide film.

4. The packaging material of claim 1, wherein the heat shrinkable sealant film is laminated on one surface of the heat shrinkable film.

5. The packaging material of claim 1, wherein the heat shrinkable sealant film is laminated on both surfaces of the heat shrinkable film.

6. The packaging material of claim 1, wherein the heat shrinkable sealant film is a biaxially stretched film comprising a linear low density ethylene polymer.

7. The packaging material of claim 1, wherein the heat shrinkable film is a biaxially stretched film comprising a polyamide and the heat shrinkable sealant film is a biaxially stretched film comprising a linear low density ethylene polymer which is laminated on both surfaces of the heat shrinkable film.

* * * * *